June 12, 1956 S. D. RUSSELL 2,750,205
RETRACTIBLE DRAWBAR SUPPORT
Original Filed June 21, 1949 2 Sheets-Sheet 2
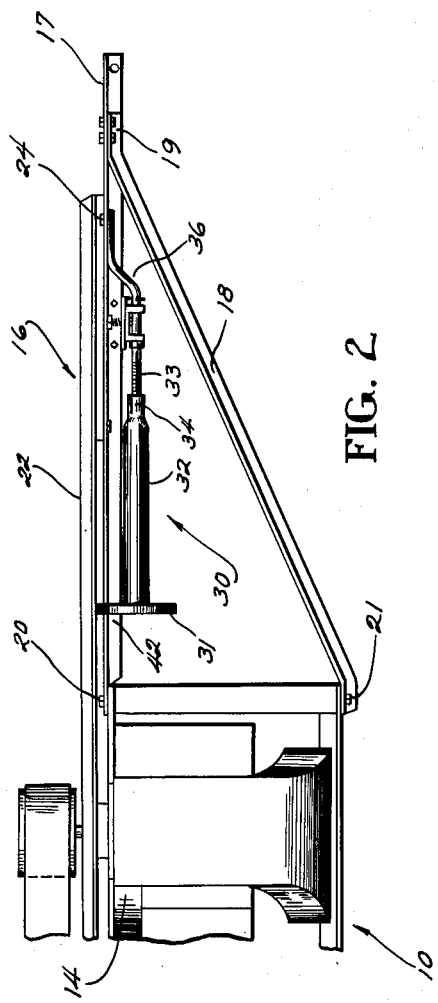
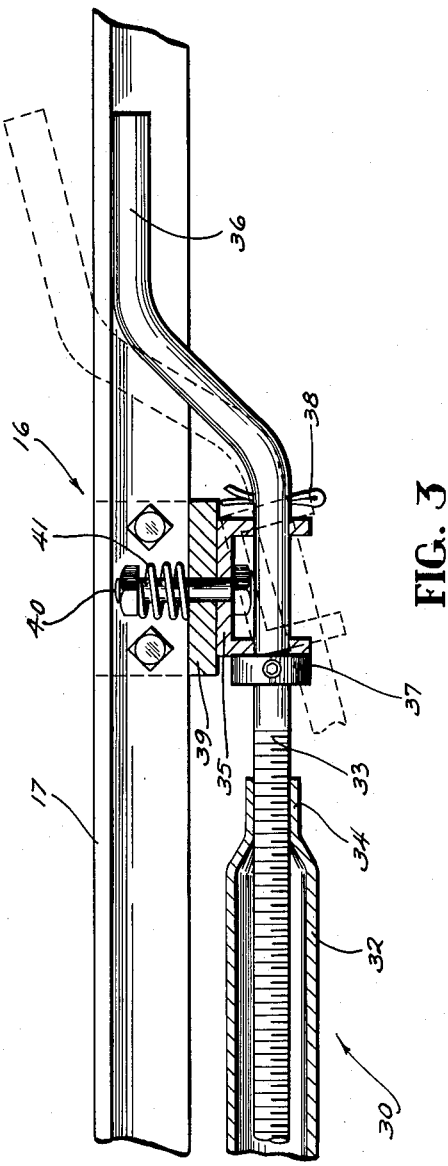
INVENTOR
STANLEY D. RUSSELL
BY
Emerson B Donnell
ATTORNEY

United States Patent Office 2,750,205
Patented June 12, 1956

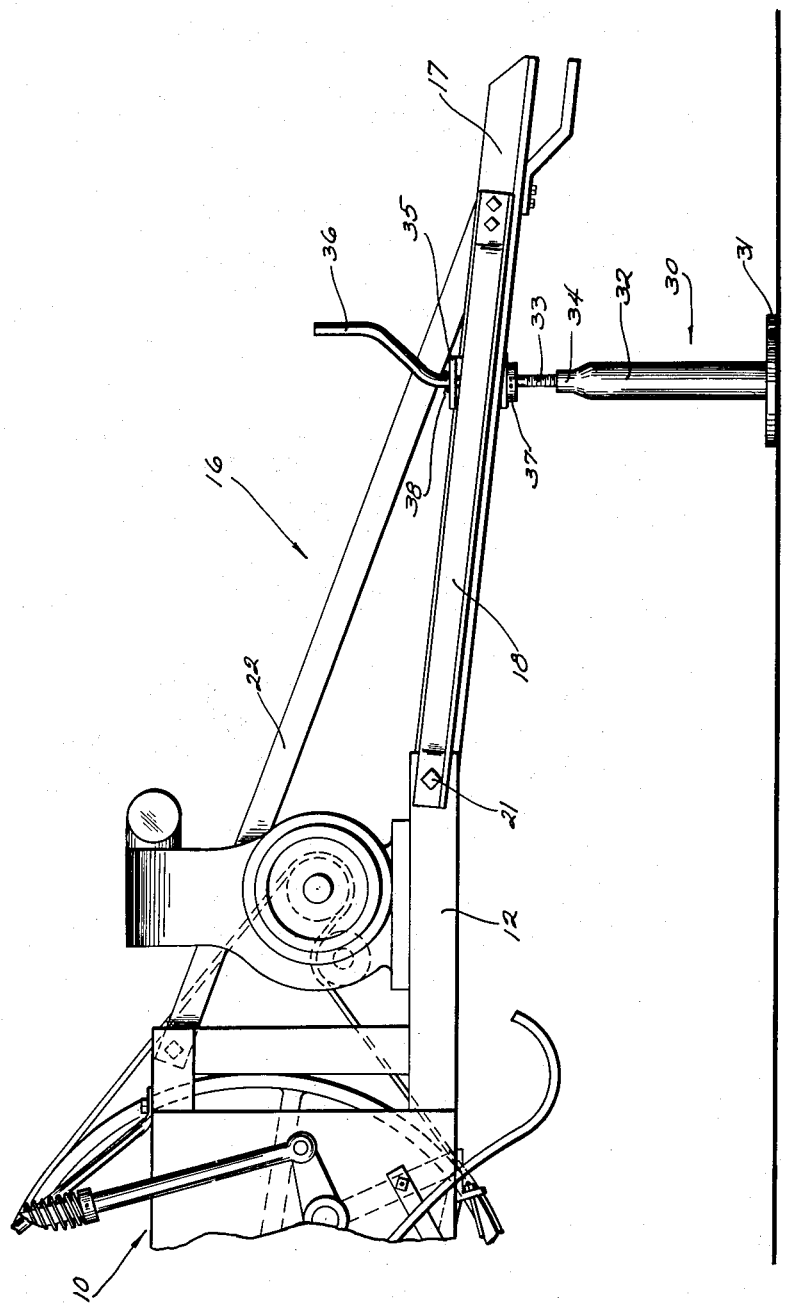

2,750,205
RETRACTIBLE DRAWBAR SUPPORT

Stanley D. Russell, Racine, Wis., assignor to J. I. Case Company, Racine, Wis., a company of Wisconsin Original application June 21, 1949, Serial No. 100,345, now Patent No. 2,696,391, dated December 7, 1954. Divided and this application October 28, 1954, Serial No. 465,339

3 Claims. (Cl. 280—150.5)

This invention relates to baling machinery and particularly to pickup balers designed to move over the field and pick up hay or other fibrous material which is baled during the progress of the machine over the field.

This application is a division of the co-pending application to Stanley D. Russell, Serial No. 100,345, filed June 21, 1949, for Pickup Balers, and which is now Patent No. 2,696,391, granted December 7, 1954.

An object of this invention is to provide a novel means of supporting the hitch end of the baler when not connected to the tractor.

Further objects and advantages will become apparent from the annexed specification and drawings in which a satisfactory embodiment of the machine is shown. However, it is to be understood that the invention is not limited to the details disclosed, but includes all such variations and modifications as fall within the spirit of the invention, as herein expressed.

In the drawings, Fig. 1 is a fragmentary right side elevation of the forward part of the machine, showing the invention.

Fig. 2 is a plan view, slightly reduced in size of the portion shown in Fig. 1.

Fig. 3 is a fragmentary enlarged portion of the support means partly in section.

As fully described in the Russell Patent No. 2,696,391, this invention relates specifically to the support means for the pickup baler. Referring to Figs. 1 and 2, a bale case 10 extends longitudinally from the baler and is supported by transport wheels, not shown, and which wheels are conventional.

Members 12 and 14 of case 10 extend forwardly and terminate in an engine platform forming a continuation of case 10.

Portion 16, shown in Figs. 1 and 2 and partly in Fig. 3 comprises forwardly extending members 17 and 18 which are united at 19 to form an A or drawbar frame. Member 17 is pivoted at 20 to member 14 of the engine platform, while member 18 is pivoted at 21 to the member 12. To render the arrangement stable, a diagonal brace 22 is pivoted to an upper portion of bale case 10 and also to the above mentioned member 17, as by a bolt 24.

For convenience in supporting the machine, in the absence of a tractor or other supporting vehicle, a stand generally designated as 30 is provided attached to drawbar 16. As seen in Figs. 1 to 3, this stand 30 comprises a plate 31 carrying an upstanding tubular member 32 which has a shaft 33 threadedly engaged therein at a constricted portion 34. Shaft 33 is journaled in a clevis 35 and has a crank portion 36, by which it may be rotated to raise and lower drawbar 16, as will be apparent in Fig. 1. A collar 37 prevents endwise movement of shaft 33 in clevis 35 in one direction and a pin or cotter 38 prevents such movement in the other direction. Clevis 35 is urged against a bracket 39, fixed to member 17, by a bolt 40, and a spring 41 surrounding the bolt and forcing clevis 35 into contact with bracket 39.

When stand 30 is not in use, it is swung to an inoperative position as indicated in Figs. 2 and 3. To reach this position, plate 31 must pass the flange portion 42 of above mentioned member 17, as shown in Fig. 2. This is accomplished by the compression of spring 41 thus shifting the clevis 35 temporarily away from bracket 39 as suggested in dotted lines in Fig. 3. When stand 30 reaches its inoperative position, spring 41 maintains the parts in the position shown in Figs. 2 and 3 until again needed to support the drawbar 16.

It will appear that a novel support has been provided which will assure ease in adjusting the drawbar to the proper height, preparatory to hitching the baler to the tractor.

What is claimed as new and desired to be secured by Letters Patent of the United States is:

1. A drawbar for a baler, having a longitudinally extending baler chamber, constituting the main body of the baler, said drawbar comprising a pair of converging members extending forwardly from said bale chamber and comprising an A frame, one of said members having an inwardly extended flange, a stand for said drawbar including a lower ground engaging foot plate and an upstanding extensibly adjustable portion, and means for swingingly connecting said adjustable portion with said drawbar for swinging into substantially horizontal inoperative positions, said connecting means being disposed to swing said lower foot plate in a path such that it will interfere with said inwardly extending flange, and said connecting means being constituted to yield to provide for passing of said flange by said foot plate but to exert sufficient resistance to such yielding that said foot plate will be supported on said flange against inadvertent displacement until manually forcibly displaced.

2. A drawbar for a baler, said drawbar comprising a plurality of members extending forwardly from said baler and comprising a drawbar frame, one of said members having a substantially horizontally extended flange, a stand for said drawbar including a lower ground engaging foot plate and an upstanding extensibly adjustable portion, and means for swingingly connecting said adjustable portion with said drawbar for swinging into a substantially horizontal inoperative position, said connecting means being disposed to swing said lower foot plate in a path such that it will interfere with said substantially horizontally extending flange, and said connecting means being constituted to yield to provide for passing of said flange by said foot plate but to exert sufficient resistance to such yielding that said foot plate will be supported on said flange against inadvertent displacement until manually forcibly displaced.

3. In a baler having a main body portion, a drawbar including a member extending forwardly from said main body portion and having a substantially horizontally extended flange, a stand for said drawbar including a lower ground engaging foot plate and an upstanding extensibly adjustable portion, and means for swingingly connecting said adjustable portion with said member for swinging into a substantially horizontal inoperative position, said connecting means being disposed to swing said lower foot plate in a path such that it will interfere with said substantially horizontally extending flange, and said connecting means being constituted to yield to provide for passing of said flange by said foot plate but to exert sufficient resistance to such yielding that said foot plate will be supported on said flange aganst inadvertent displacement until manually forcibly displaced.

References Cited in the file of this patent
UNITED STATES PATENTS

| | | |
|---|---|---|
| 2,153,722 | Loughmiller | Apr. 11, 1939 |
| 2,162,181 | Skinner | June 13, 1939 |
| 2,205,436 | Richards | June 25, 1940 |
| 2,634,941 | Eckert | Apr. 14, 1953 |